United States Patent
Bhatt

(10) Patent No.: US 8,195,393 B2
(45) Date of Patent: Jun. 5, 2012

(54) ANALYZING AND CONSOLIDATING TRACK FILE DATA

(75) Inventor: Nikhil Bhatt, Cupertino, CA (US)

(73) Assignee: Apple Inc., Cupertino, CA (US)

(*) Notice: Subject to any disclaimer, the term of this patent is extended or adjusted under 35 U.S.C. 154(b) by 522 days.

(21) Appl. No.: 12/495,627

(22) Filed: Jun. 30, 2009

(65) Prior Publication Data

US 2010/0332124 A1    Dec. 30, 2010

(51) Int. Cl.
G01C 21/00 (2006.01)
G06F 17/30 (2006.01)

(52) U.S. Cl. ......... 701/475; 701/469; 701/518; 701/534

(58) Field of Classification Search .................... 701/475
See application file for complete search history.

(56) References Cited

U.S. PATENT DOCUMENTS

| 6,804,621 B1* | 10/2004 | Pedanckar ............... 702/94 |
| 6,950,123 B2* | 9/2005 | Martins ................. 348/157 |
| 2007/0203639 A1* | 8/2007 | Van Den Broeck ......... 701/205 |
| 2008/0068257 A1* | 3/2008 | Mizuochi ............. 342/357.01 |

* cited by examiner

Primary Examiner — Michael J. Zanelli
(74) Attorney, Agent, or Firm — Fish & Richardson P.C.

(57) ABSTRACT

Methods, systems, and apparatus, including computer programs encoded on computer storage media, are disclosed for track simplification and correction. In one aspect, a track data set having track points defining a course can be accessed and inaccurate track points and incorrect track points can be identified, wherein identifying inaccurate track points includes comparing, for one or more of the track points, a dilution of precision (DOP) value associated with the track point to a DOP threshold, and identifying incorrect track points includes performing an error correction process. Also, a corrected track can be generated by removing identified inaccurate track points and incorrect track points from the track data set. Further, identifying an inaccurate track point can include determining that the DOP value associated with the track point exceeds the DOP threshold. Additionally, the DOP threshold can be specified by user input.

36 Claims, 11 Drawing Sheets

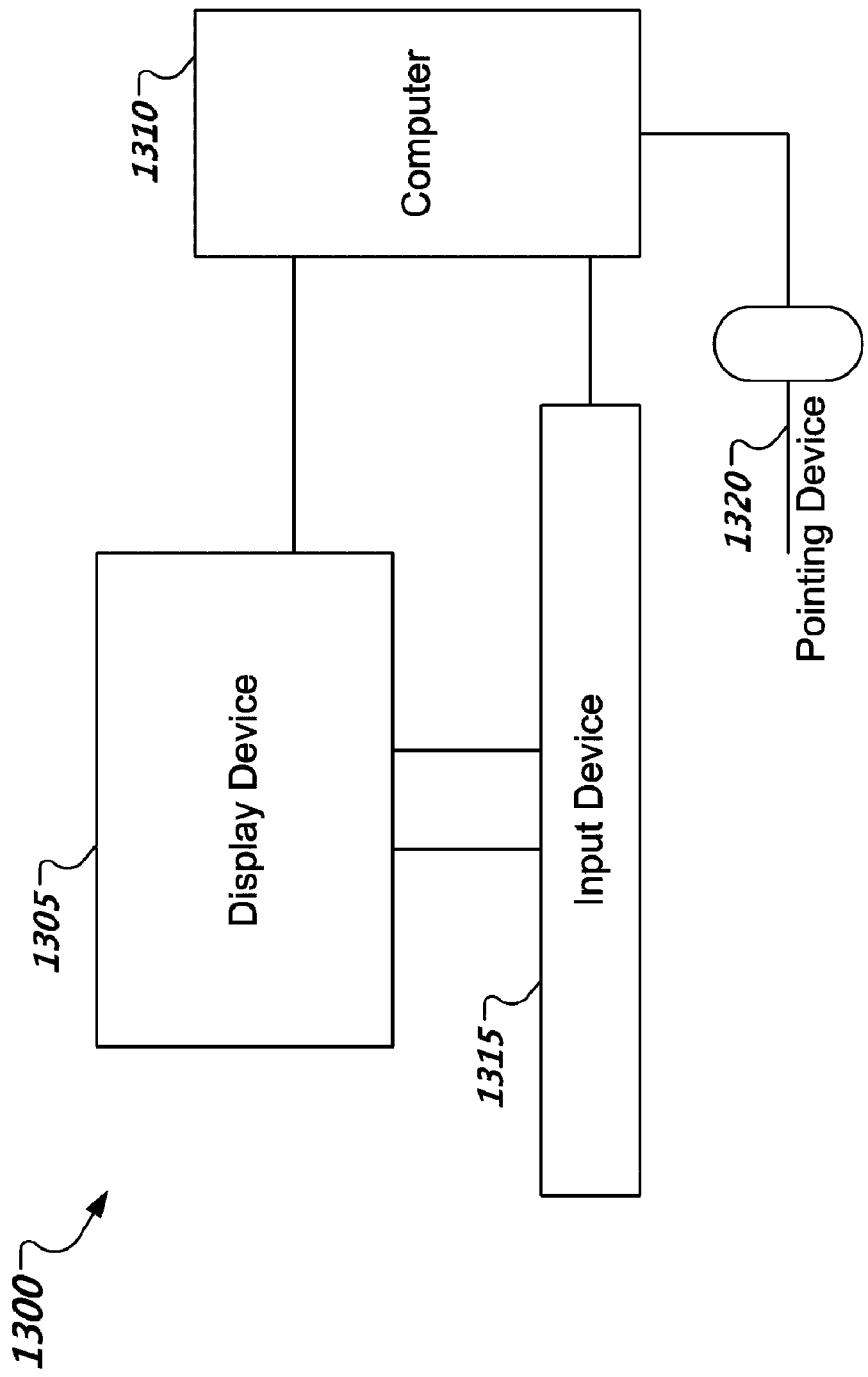

ANALYZING AND CONSOLIDATING TRACK FILE DATA

TECHNICAL FIELD

This disclosure relates to tracks generated in response to positioning system signals, and to analyzing and processing track file data, such as to consolidate redundant entries and to generate a simplified representation of the track file data.

BACKGROUND

The Global Positioning System ("GPS") is a global navigation satellite system typically used, as its name suggests, for navigation and guidance purposes. GPS is widely used for map-making, land surveying, commerce, scientific applications, and vehicle tracking and surveillance. GPS employs a constellation of between 24 and 32 Earth orbiting satellites, each of which transmits highly accurate radiowave signals. The radiowave signals allow a GPS receiver to determine its current location, its velocity, and the time. A GPS receiver calculates its position, including latitude, longitude, and elevation, by precisely timing the signals received from the GPS satellites. Once determined, the coordinates can be displayed on the GPS receiver as points.

Each of the GPS satellites transmits periodic messages containing the time the message was sent, precise orbital information, and the general system health and rough orbits of all GPS satellites. A GPS receiver determines the transit time of each received message and uses the transit time to compute the distance between the receiver and the corresponding GPS satellite. Geometric trilateration is used to combine the computed distances with the location of the satellites to calculate the GPS receiver's location. Additionally, time-based information, such as the direction and speed of the GPS receiver, can be calculated from a series of determined locations. GPS receivers also can store data indicating which satellites transmitted signals that were used, the potential precision of the data received, and one or more manually entered waypoints.

A track log (or "track") is a collection of track points along the course of a route. A track log can be created by a GPS receiver as the user navigates a route. Further, a track log can be saved in a track file that lists one or more sequential coordinates in 3-D space, such as latitude, longitude and elevation. Additionally, a track file can be stored in a variety of file formats, such as the GPS Exchange Format ("GPX") and the National Marine Electronic Association ("NMEA") specification.

SUMMARY

This disclosure describes technologies relating to analyzing and processing track data. A GPS receiver can record points (or track points) associated with a track, such as over a period of time. The points can be organized in a track data set, which includes data corresponding to a track. Further, the track data set can be recorded in one or more files, e.g. a track file, one or more database records, or any other such collection of data. A track data set can be analyzed and processed, such as to simplify and/or correct a track. Through processing, one or more points can be eliminated, such as redundant or erroneous points. For example, the analysis and processing can include eliminating points based on Dilution of Precision (DOP) value. A DOP value represents positional accuracy, with a low DOP value representing better positional accuracy. The DOP value also can be represented as separate DOP measurements, including HDOP (horizontal DOP), VDOP (vertical DOP), PDOP (3-D position or positional DOP) and TDOP (time DOP). If the DOP value associated with a point exceeds a pre-defined DOP threshold value, the point can be eliminated.

The analysis and processing also can include deleting one or more track points associated with an acceleration rate that exceeds a pre-defined acceleration rate threshold value. Further, one or more points that were erroneously included in the track, even though they were not traveled, also can be deleted. Additionally, the analysis and processing can include eliminating one or more points that are associated with a severe angle in a track. The one or more points that are eliminated can correspond to midpoints between two or more vectors that form an acute angle. After completion of the analysis and processing the remaining track points can represent a simplified track. A track data set, e.g. a track file, can be stored in a storage device associated with the GPS receiver or in a separate storage device. Also, a track boundary can be determined based on the points included in the track. Additionally, one or more meta-points can be generated within the track boundary based on the points associated with the track. The meta-points can include a centroid and a bounding rectangle.

In general, in one aspect, the techniques can be implemented to include accessing a track data set having track points defining a course; identifying inaccurate track points and incorrect track points, wherein identifying inaccurate track points includes comparing, for one or more of the track points, a dilution of precision (DOP) value associated with the track point to a DOP threshold, and identifying incorrect track points includes performing an error correction process; and generating a corrected track by removing identified inaccurate track points and incorrect track points from the track data set. Further, the techniques can be implemented such that identifying an inaccurate track point further includes determining that the DOP value associated with the track point exceeds the DOP threshold. Additionally, the techniques can be implemented such that identifying inaccurate track points can be performed before, after, or substantially simultaneously with identifying incorrect track points.

The techniques also can be implemented to include receiving user input specifying the DOP threshold. Further, the techniques can be implemented such that the DOP value associated with the track point is a horizontal DOP value. Additionally, the techniques can be implemented such that performing an error correction process further includes determining an acceleration value corresponding to a track point; comparing the determined acceleration value to an acceleration threshold; and identifying the track point as an incorrect track point when the determined acceleration value exceeds the acceleration threshold.

The techniques also can be implemented such that the acceleration threshold is determined in accordance with a sampling frequency of the track points. Further, the techniques can be implemented such that performing an error correction process includes determining, for a sequence of three or more track points, a total distance traveled and a net distance traveled; comparing the net distance traveled to the total distance traveled; and identifying a track point included in the sequence of three or more track points as an incorrect track point when the total distance traveled exceeds the net distance traveled by more than a distance threshold.

The techniques also can be implemented to include determining that a common location value is associated with successive track points included in the track and consolidating the successive track points to generate a meta-point. Further, the techniques can be implemented to include determining a start time and an end time corresponding to the meta-point in accordance with time data associated with the successive track points.

The techniques also can be implemented to include identifying a first track point and a second track point located within a bounded area; determining that a duration between the first track point and the second track point exceeds a minimum time threshold; and generating a meta-point by coalescing the first track point and the second track point. Further, the techniques can be implemented such that the meta-point is characterized by a geometric shape, a time range, a starting track point, and an ending track point. The techniques also can be implemented to include receiving user input defining the geometric shape. Additionally, the techniques can be implemented such that removing identified inaccurate track points and incorrect track points from the track data set further includes receiving user input confirming removal of the identified inaccurate track points and incorrect track points. Moreover, the techniques can be implemented such that generating a corrected track further entails including in the corrected track an interpolated track point having an interpolated location, the interpolated track point corresponding to at least one incorrect track point. Other implementations of this aspect include corresponding systems, apparatus, and computer programs, configured to perform the actions of the methods, encoded on computer storage devices.

Particular implementations of the disclosed techniques can be executed to realize one or more of the following potential advantages. The techniques can be implemented to improve the clarity of coordinate and time data received from one or more GPS satellites. The techniques also can be implemented to simplify a track file storing points associated with a route. For example, points can be consolidated to reduce or eliminate redundancy. Additionally, the techniques can be implemented to eliminate points erroneously included in a track. Moreover, the techniques can be implemented to better represent the track traversed by a user. Improved track files can be stored at, and displayed on, a computing device, such as a GPS receiver.

In addition, the techniques can be implemented to generate one or more meta-points by coalescing one or more received points. The meta-point can represent an area in which a GPS receiver was located for longer than a predetermined period of time. The techniques also can be implemented to generate synthetic waypoints based on the coalesced meta-points. A synthetic waypoint can include location information and, in some implementations, also can include a range and/or a time, e.g. a starting and ending time.

Further, the techniques can be implemented to simplify or consolidate track information for use in organizing a set of digital images. For example, one or more images can be associated with a point included in a track.

Details of one or more implementations of the subject matter described in this specification are set forth in the accompanying drawings and the description below. Other features, aspects, and advantages will become apparent from the description, the drawings, and the claims.

BRIEF DESCRIPTION OF THE DRAWINGS

FIG. 13 is a schematic diagram of an example computer system that can be utilized to implement the disclosed systems and methods.

Like reference numbers and designations in the various drawings indicate like elements.

DETAILED DESCRIPTION

The accuracy of a track can be directly related to the accuracy of the coordinate information received or computed from the source of navigational information, such as GPS. Inaccurate coordinate information can cause one or more inaccurate points to be associated with a track. One or more inaccurate points (or "bad points") associated with a track can be identified and excluded, such as through deletion. Further, redundant points associated with a track can be identified and consolidated or coalesced. In some implementations, inaccurate coordinate information can be identified and excluded before a corresponding point is recorded or displayed. In some other implementations, a track, e.g. represented by a track data set, can be subsequently processed to identify bad points and/or redundant points associated with a track.

In some implementations, positional accuracy can be related to the GPS receiver's speed while in motion. For example, a GPS receiver determines its position based on information provided by multiple GPS satellites. Thus, a moving receiver can obtain different positional information than a motionless receiver. In some instances, the location of points recorded by a motionless receiver can include significant variance (or "jitter"), incorrectly indicating that the receiver was in motion. When a sequence of points affected by jitter is displayed, the track can indicate motion that did not actually occur.

Figure 1:
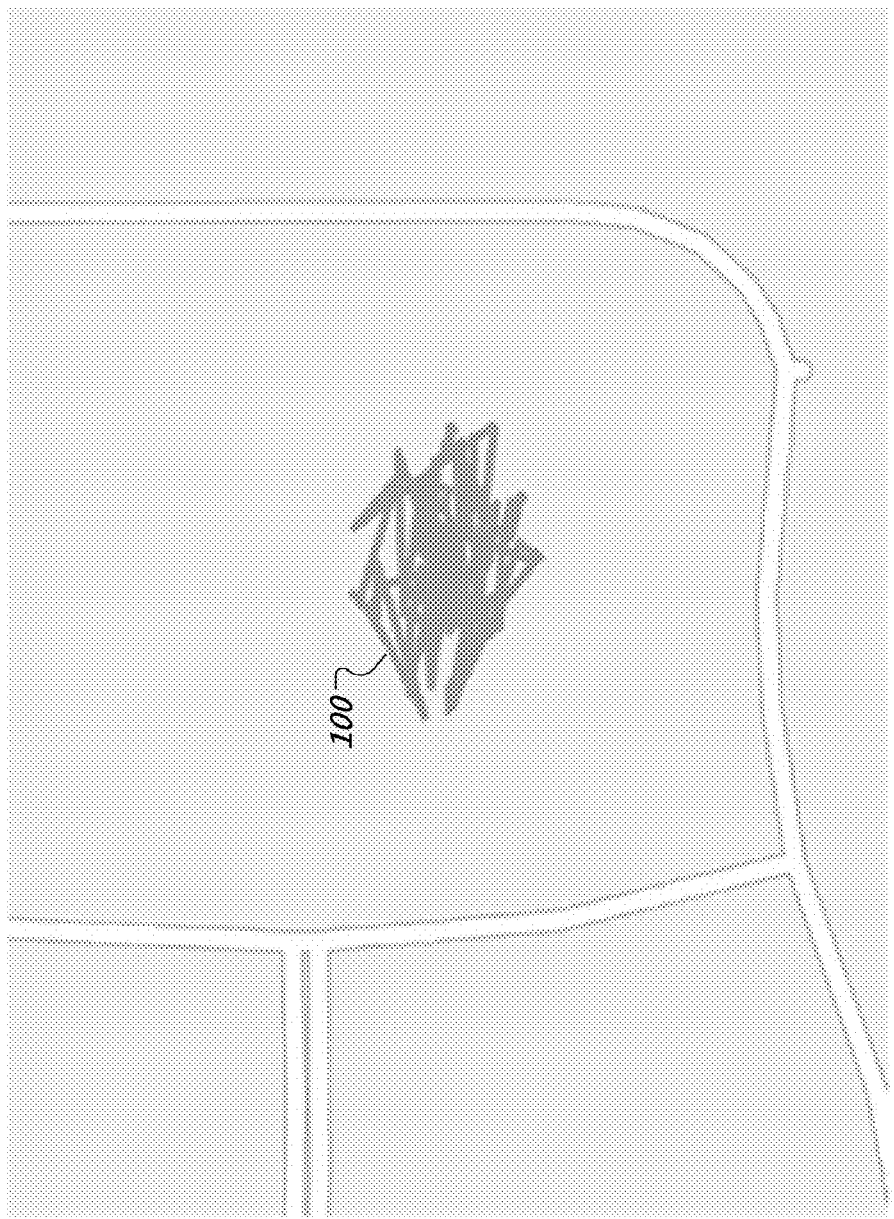
FIG. 1 shows an example of a track generated from coordinate information provided by a motionless GPS receiver.

FIG. 1 shows an example of a track generated from coordinate information recorded by a motionless device including a GPS receiver. Track 100 represents the points determined by the GPS receiver over a period of time. Although the GPS receiver's position remained static, the coordinate information determined by the GPS receiver varied significantly. As a result, the positional errors affected the accuracy of the recorded track 100.

The accuracy of points associated with the track can be improved by applying software correction techniques. The software correction techniques can be implemented using one or more software applications operatively coupled to a data processing device that can read track 100 from a track file. The one or more software applications can analyze and process points associated with track 100 to improve the accuracy of track 100. In some implementations, a device including a GPS receiver or other such navigational tool can be configured to implement the software correction techniques in conjunction with determining and recording track points. Alternatively, a device can be configured to implement the software correction techniques with respect to a previously recorded track.

Figure 2:
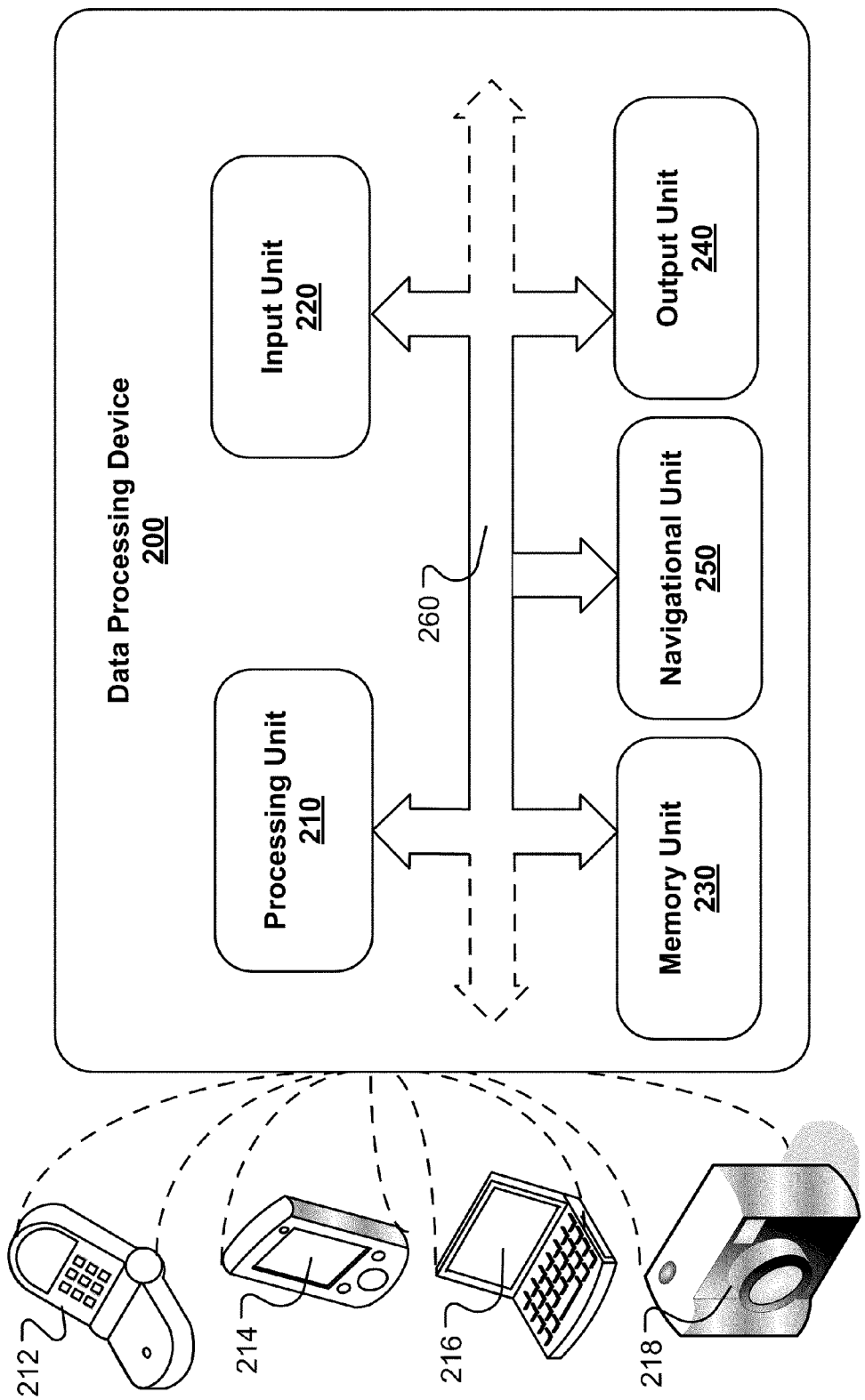
FIG. 2 shows an example of a data processing device for simplifying and correcting tracks.

FIG. 2 shows an example of a data processing device for simplifying and correcting tracks. Data processing device 200 can include components, such as processing unit 210, input unit 220, memory unit 230, output unit 240, and navigational unit 250. Components included in data processing device 200 can be interconnected using data communication link 260. For example, each component of data processing device 200 can be configured to communicate with at least one other component using data communication link 260. Data communication link 260 can be implemented using any communication architecture, including a system bus, a communication bus interface, or a signal line. Further, data communication link 260 can provide bidirectional communication among the connected components. For example, track files, information used to generate track files, and information associated with track files can be transmitted over the data communication link 260. In some implementations, separate connections can be provided between two or more of the components 210, 220, 230, 240 and 250 in place of or in addition to data communication link 260.

Data processing device 200 can be implemented in various electronic devices, such as mobile phone 212, personal digital assistant 214, portable computer 216, and camera 218. Mobile phone 212 can be implemented as a cellular phone or a web-enabled smart phone, such as an iPhone® manufactured by Apple Inc. of Cupertino, Calif. Personal digital assistant 214 can be implemented as a handheld or palmtop computer. Portable computer 216 can be implemented as a microcomputer, a mini-computer, a laptop computer, a notebook computer, or a special purpose computing device. Camera 218 can be implemented as a digital camera, a digital video camera, or other such image capturing device. Alternatively, data processing device 200 can be included in a hand-held or embedded navigation unit. In some implementations, data processing device 200 can be a non-mobile device configured to receive track file information from a mobile device or navigation unit.

Processing unit 210 can be implemented as a central processing unit, special purpose processor, or a combination thereof. Input unit 220 can include one or more user interface elements, such as a keyboard, a mouse, a track ball, a rotary dial or wheel, a touchpad, a touch-screen, a microphone and a motion sensor, such as an accelerometer or a gyroscope. In some implementations, input unit 220 can include one or more external elements that interface with the data processing device 200. For example, any of the user interface elements can be an external element that communicates through a wired or wireless interface with data processing device 200 to provide user input. Wired communication mechanisms can include, for example, a Universal Serial Bus (USB) interface or FireWire (IEEE 1394) interface. Wireless communication mechanisms can include, for example, Bluetooth or infrared technologies.

Memory unit 230 can be implemented using one or more volatile and/or non-volatile memory modules. Memory unit 230 can be implemented as a storage unit that can be configured as a local storage device or local memory cache. Coordinate information received from navigational unit 250 can be stored at memory unit 230. Recorded track files and information associated with track files also can be stored at memory unit 230. In some implementations, memory unit 230 or an additional memory unit can be located remotely from the data processing device 200. For example, memory unit 230 can be located on a server or other network connected appliance.

Output unit 240 can be implemented as a display unit, such as a liquid crystal display (LCD) or an organic light emitting diode (OLED) display, and can include one or more speakers.

In some implementations, output unit 240 can be at least partially integrated with input unit 220. Navigational unit 250 can be implemented to perform either or both of receiving and calculating coordinate and time information representing a location of data processing device 200. For example, a GPS unit can be configured to receive position and time information from GPS satellites and to calculate coordinates representing a location of the GPS unit. The position information received from a GPS satellite can include a DOP value. Further, the coordinate information calculated by navigational unit 250 also can be provided to output unit 240 for presentation, such as on a display. Navigational unit 250, separately or in combination with processing unit 210, also can be implemented to analyze and process the received coordinate and time information, as described with respect to FIGS. 3-13. Navigational unit 250 can be implemented in hardware and configured to operate one or more software applications, such as a track file correction application. Alternatively, navigational unit 250 can be implemented as one or more applications, modules or functions, implemented in executable instructions.

Data processing device 200 can include or communicate with one or more photo organizing and sharing applications, such as Aperture® distributed by Apple Inc., to provide location and time information associated with one or more captured images. For example, a captured image can be associated with a track point generated by navigational unit 250. Additionally, the captured image can include location and time information generated by navigational unit 250. When displayed, such as through output unit 240, an image can indicate or otherwise be associated with the location and time at which it was captured. Further, images can be organized based on the time at which each image was captured. For example, a series of images can be ordered based on the time associated with each image. Further, the series of images can be associated with a track, such that one or more points in the track represent a time and location at which a corresponding image was captured.

One or more elements of the location data received or computed by data processing device 200 can include errors, such as due to the received signal quality or the physical environment in which navigational unit 250 is located, e.g., in a canyon or inside a building. Thus, data processing device 200 can be implemented to correct inaccurate location data, and to analyze and consolidate track file data.

Figure 3:
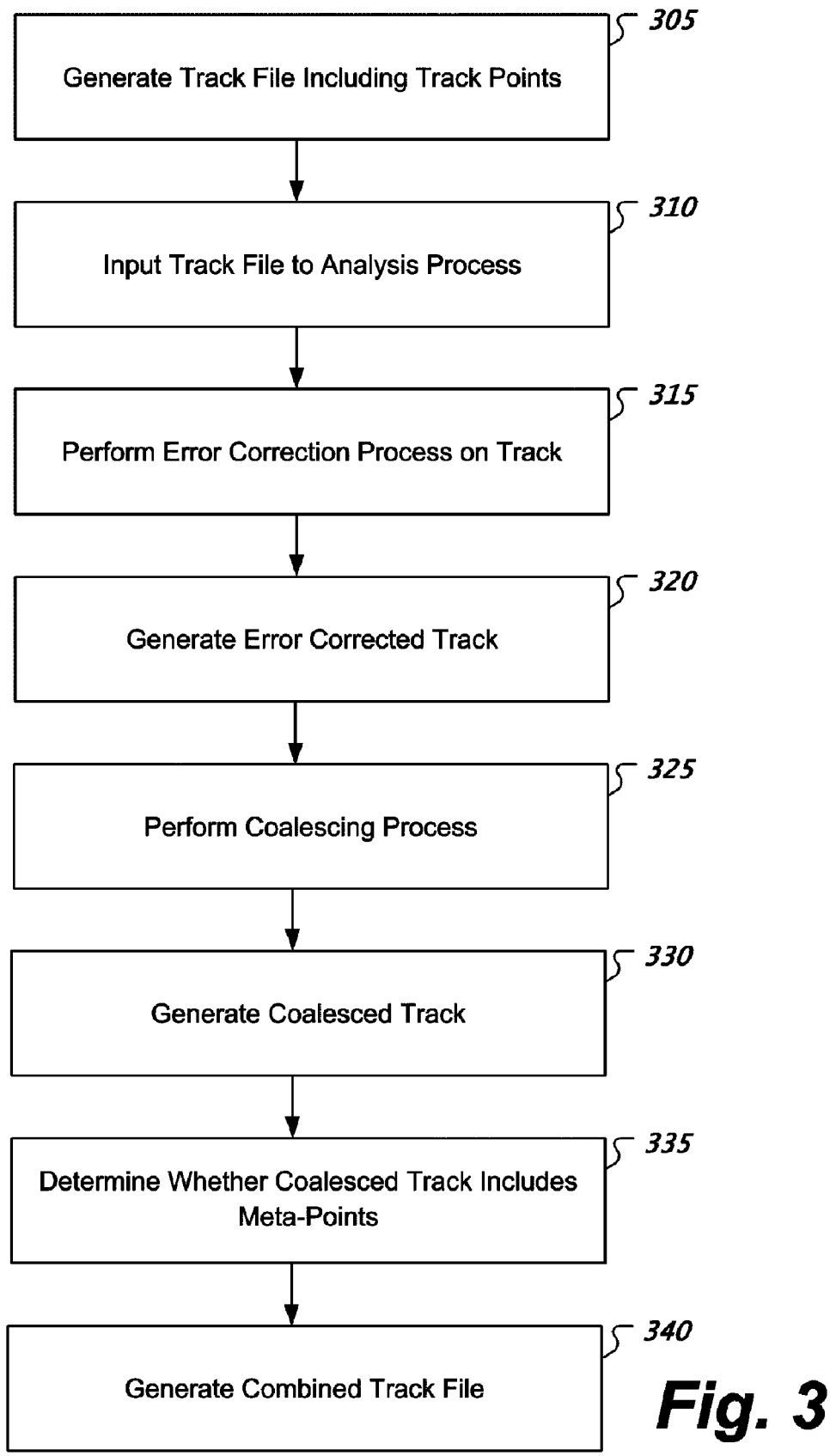
FIG. 3 shows an example of a correction process for analyzing and consolidating track file data.

FIG. 3 shows an example of a correction process for analyzing and consolidating track file data. A correction process can be implemented in one or more correction applications, modules, or functions. A track file including track points (or points) corresponding to at least one track can be generated (305). For example, a data processing device can be configured to determine and record track points identifying location and time information at a predetermined interval, such as every 30 or 60 seconds. In some implementations, one or more track points can be recorded without time information. Further, the track file can be provided as input to an analysis process (310). The analysis process can be configured to perform one or more operations to improve the accuracy of track points associated with a track, to simplify a track included in the track file, to include additional data, or any combination thereof. In some implementations, one or more operations can be omitted, performed in a different order, or replaced with one or more other operations. For example, in implementations in which time information is not recorded for at least some track points, time dependent processing can be suspended for at least the track portions that do not include time information. For example, an acceleration correction operation can be skipped or a coalescing operation can be performed without respect to time. Further, user input can be received specifying a particular portion of a track for which analysis and processing is to be performed. For example, the user input can specify a beginning track point, an end track point, and one or more processes to be performed.

An error correction process can be performed to identify and/or eliminate one or more track points associated with a track in the track file that satisfy one or more error correction criteria (315). The error correction process can identify and/or eliminate inaccurate track points and incorrect track points. The error correction process can include one or more error identification operations that can be performed with respect to track points associated with the track. In some implementations, two or more error identification operations can be performed simultaneously. Further, the order of the error identification operations to be performed can be varied.

A dilution of precision (DOP) correction operation can be performed on the track file. The DOP correction operation can be configured to analyze, for one or more track points, a DOP value corresponding to the track point. If the DOP value exceeds a DOP threshold value, the track point can be marked or deleted from the track file. In some implementations, the DOP correction operation can be configured to evaluate only one type of DOP value, such as horizontal DOP (latitude/longitude precision). The DOP threshold value can be predetermined. For example, a particular DOP threshold value can be applied based on one or more factors, such as the navigational unit or device manufacturer. Alternatively, the DOP threshold value can be provided by a user. For example, user input can be received through an interface device, such as a slider, specifying the DOP threshold to apply. Further, the DOP threshold value can be applied only to the particular track being processed or can be accepted as a global value.

Further, one or more bad point correction operations can be performed. Bad point correction operations can include an acceleration correction operation, a net distance correction operation, a severe angle correction operation, and an overlapping circle correction operation. For example, an acceleration correction operation can be applied to points associated with a track included in the track file. In the acceleration correction operation, an acceleration rate can be determined for a track point based on an analysis of the change in recorded position of the device capturing the track points relative to time, as indicated by neighboring points. If an acceleration threshold is exceeded, the track point can be marked or deleted from the track file.

In the net distance correction operation, the distance traveled from an immediately preceding track point to a current track point can be calculated. Also, the distance traveled from the current track point to the immediately succeeding track point can be calculated. A net distance can then be determined. If the net distance traveled between the immediately preceding track point and the immediately succeeding track point does not exceed a distance threshold, the current track point can be marked or deleted from the track file.

Further, a severe angle correction operation can be performed with respect to track points associated with a track. In the severe angle correction operation, an acute angle between three successive track points can be determined. If the acute angle is less than a severe angle threshold, the intermediate track point can be marked or deleted from the track file.

Additionally, an overlapping circle correction operation can be performed for track points associated with a track. For example, track points corresponding the track can be augmented with a circle having a radius representative of the DOP value of the track point. The circle can be centered on the associated track point and the radius can increase with the DOP value. Overlaps between circles can be used to evaluate the accuracy of one or more track points. If a track point's accuracy is determined to be below an accuracy threshold, the track point can be marked or deleted from the track file.

One or more of the bad point correction thresholds, i.e. the acceleration threshold, the distance threshold, the severe angle threshold, and the accuracy threshold, can be predetermined. Alternatively, one or more of the bad point correction thresholds can be provided by a user. For example, user input can be received through an interface device, such as a slider, specifying the threshold to apply. In some implementations, sliders corresponding to any combination of the bad point correction thresholds can be presented in a user interface. Further, a user supplied bad point correction threshold can be applied only to the particular track being processed or can be accepted as a global value, e.g. based on user specification.

An error corrected track can be generated based on the results of the error correction process (320). In some implementations, the original track can be overwritten or modified, such that the track file includes only the error corrected track. In some other implementations, a track point list can be edited to reflect one or more error corrections. Further, a coalescing process can be performed on the error corrected track (325). The coalescing process can analyze the location of track points included in the error corrected track to identify track points that fall within a bounded area that complies with predetermined dimension thresholds. In some implementations, a duration threshold also can be used in performing the coalescing process. For example, the track points to be coalesced must correspond to a minimum time period. Track points occurring within the bounded area, and satisfying the duration requirement if applicable, can be coalesced into a single meta-point. A coalesced track can be generated by the coalescing process (330). For example, the error corrected track can be overwritten or modified, such that it is replaced by the coalesced track.

Additionally, it can be determined whether the coalesced track includes two or more meta-points (335). If two or more meta-points are included in the coalesced track, a meta-point combining process can be performed to determine whether included meta-points can be combined. If two or more included meta-points are determined to intersect, the meta-points can be combined. The meta-point combining process can generate a combined track (340). For example, the coalesced track can be overwritten or modified, such that it is replaced by the combined track. In some implementations, the error corrected track, coalesced track, and combined track each can be separately stored, accessed, and processed.

Figure 4:
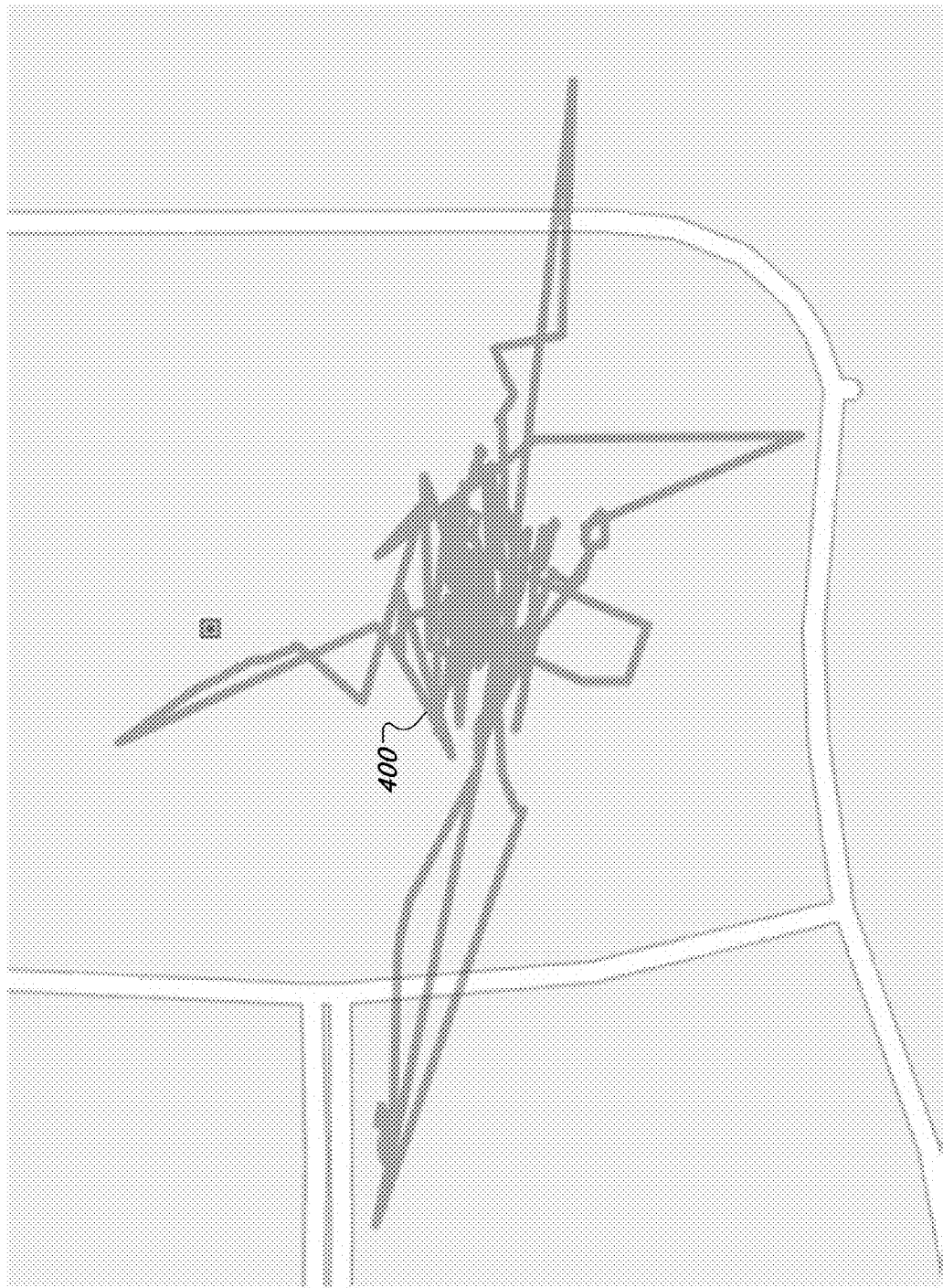
FIG. 4 shows an example of an uncorrected track generated from uncorrected track points included in a track file.

FIG. 4 shows an example of an uncorrected track generated from uncorrected track points included in a track file. The uncorrected track points were recorded by a data processing device including a navigational unit, such as a GPS receiver, and stored in a track file. One or more track points associated with the uncorrected track 400 can be provided as input to a correction process for analysis and processing.

Further, a user can provide input selecting one or more portions of a track for which either or both of correction and simplification are to be performed. A track portion can be specified by selecting the start and end of the portion. For example, the user can select a starting track point and a corresponding ending track point in a graphical depiction of a track, e.g. uncorrected track 400. A user also can selected a starting track point and a corresponding ending track point or a starting time and a corresponding ending time in a list of track points associated with a track. Corrections and/or simplification processing can be performed for each such identified track portion, without processing the remainder of the track.

Figure 5:
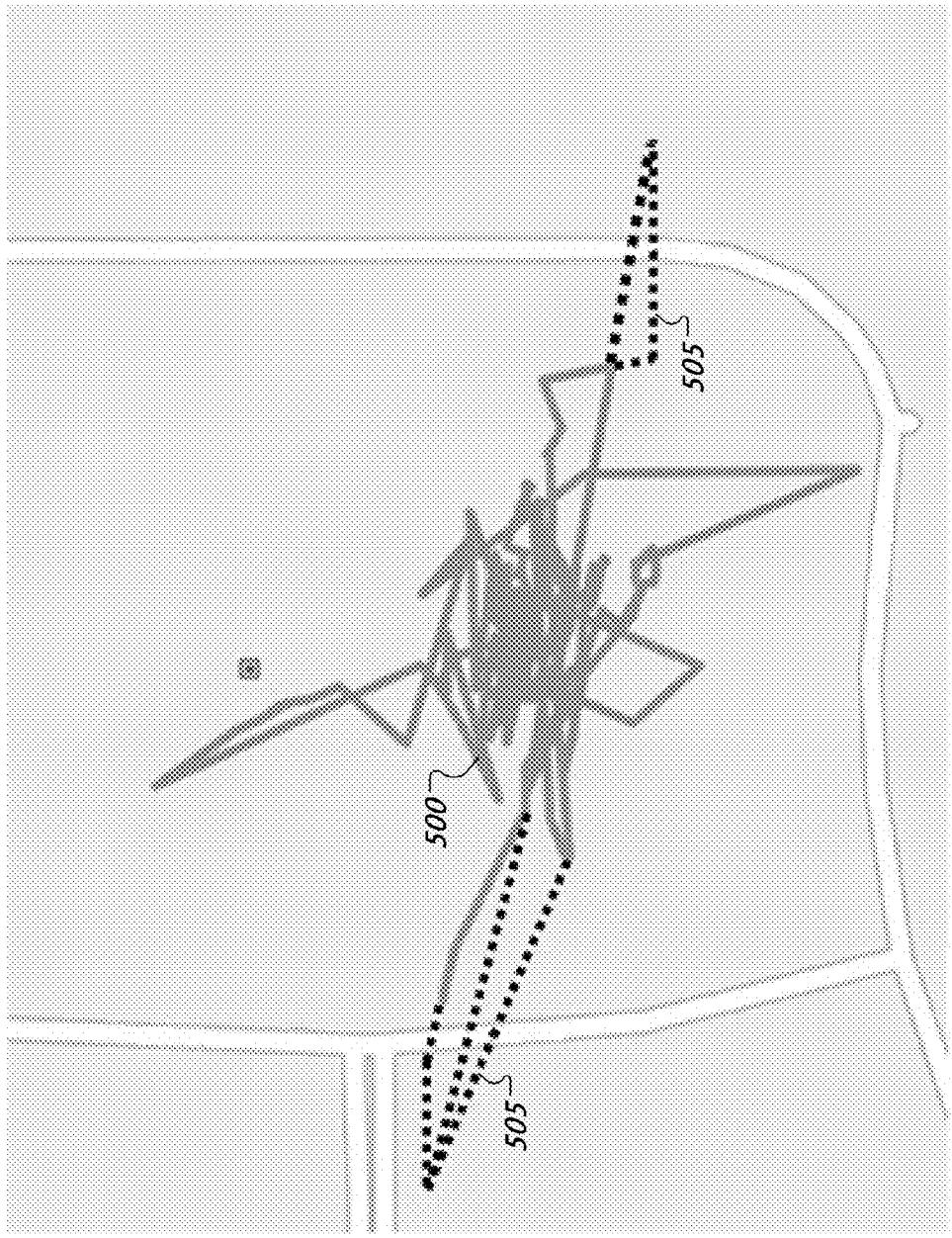
FIGS. 5-6 show examples of a track generated from error corrected track points.

FIG. 5 shows an example of a track generated from error corrected track points, such as the track 400 corrected using DOP correction techniques. The track 500 is depicted using a solid line, which indicates the track points remaining after the DOP correction techniques have been applied. Additional track segments 505 are depicted using dashed lines, indicating the track points deleted through application of the DOP correction techniques.

DOP correction techniques can be used to mark, suppress, or eliminate track points with DOP values that exceed the DOP threshold value. DOP values can range from 1, which represents ideal precision, to values between 21 and 50, which represent poor precision. In some implementations, the DOP threshold can be set to a minimum acceptable accuracy, e.g. a value of 20. In some other implementations, the DOP threshold can be selected in accordance with one or more factors, such as the navigational device in use and the rate at which the navigational device is moving.

Further, the DOP threshold value can be defined automatically by the correction application. Alternatively, the DOP threshold value can be defined in response to input from a user operating the data processing device including the navigational unit, such as data processing device 200. For example, a DOP slider or other such interface tool can be used to receive input defining the DOP threshold value. In some implementations, the interface tool can be presented in conjunction with a table of default DOP values for each known device to suggest an appropriate DOP value. The DOP threshold value can be established for use in a single operation, such as for use with a single track or any portion thereof, or as a global value for use with all tracks processed by the device.

The DOP correction techniques can be implemented to eliminate track points having DOP values that exceed the DOP threshold value. Further, a DOP value associated with a track point can be expressed using one of four measurement types: horizontal ("HDOP"), vertical ("VDOP"), positional (i.e., three-dimensional or mean) ("PDOP") and time ("TDOP"). HDOP measures precision as it relates to latitude and longitude. VDOP measures precision as it relates to altitude. PDOP measures an overall rating of precision for latitude, longitude and altitude. TDOP measures precision as it relates to time. A DOP correction technique can be applied to a track point for one or more types of DOP measurement. For example, in some implementations, a DOP correction technique can be performed only with respect to horizontal precision, such as by specifying an HDOP threshold value. In some other implementations, multiple types of DOP can be considered. The different DOP types can be weighted equally or weighted in accordance with predefined or user-specified values. Further, each type of DOP measurement considered for a point can be evaluated and DOP measurements that exceed a corresponding accuracy threshold can be ignored.

As discussed above with respect to FIG. 3, the correction application also can be implemented to detect and remove one or more bad points from the track data, which otherwise can adversely affect the accuracy of the recorded track. For example, a bad point can be identified in accordance with one or more techniques or operations, including techniques that evaluate acceleration, net distance, and severe angle.

In some implementations, acceleration correction techniques can be used to identify track points that have acceleration rates in excess of an acceleration threshold. Acceleration can be determined based on a series of track points. For example, a change in position over time can be used to determine a velocity. Further, a change in velocity over time can be used to determine an acceleration. The software correction application can be implemented to mark, suppress, or delete a point that has an acceleration rate, either positive or negative, that exceeds the acceleration threshold. In some implementations, the acceleration threshold can differ between track points, such as based on velocity. The acceleration threshold can be defined automatically by the correction application or can be established in response to user input. For example, the user can provide input to a slider or other user interface element to define the acceleration threshold. Further, a user defined acceleration threshold can be established for use in a single operation, such as for application to a single track or any portion thereof, or can be established as a global value for use with all tracks processed by the device.

In some implementations, the acceleration threshold also can depend on the sampling rate of the navigational device. For example, if a GPS receiver takes one sample every second, then the acceleration threshold can be defined to account for the change in acceleration that can occur over one second. Conversely, if a GPS receiver samples every two minutes, then the acceleration threshold can be defined to account for the larger change in acceleration that can occur over two minutes. As the sampling rate decreases, the acceleration threshold must be increased to account for the distance a user could travel over the longer time period.

Additionally, the navigational device can be configured to implement one or more net distance correction techniques. Net distance correction techniques can be implemented to eliminate points that were not actually traveled. For example, although the GPS receiver was motionless in FIG. 1, the GPS receiver mistakenly determined track points indicating that it had been moving. The net distance correction techniques can be implemented to compute the net distance traveled by evaluating three or more sequential track points. The formula for computing the net distance traveled between three sequential points can be expressed as:

$$(\text{distance}(p_0,p_1)+\text{distance}(p_1,p_2))/\text{distance}(p_0,p_2)$$

Using this formula, the correction application can determine the extent that the net distance changed between track points $p_0$, $p_1$, and $p_2$. If the correction application determines that the distance traveled exceeds the net distance between points $p_0$ and $p_2$, then point $p_1$ can be identified as a false coordinate and can be eliminated. In some implementations, the correction application can be configured to perform the net distance analysis for a predetermined number of points. In some other implementations, the correction application can be configured to suspend the net distance analysis after a distance threshold, such as net distance or total distance traveled has exceeded a threshold value. After a set of points representing a segment of the track has been analyzed, the correction application can advance to analyzing a set of points representing a different segment of the track.

The net distance techniques can be applied to more than three sequential track points. The formula for computing the net distance traveled between a series of sequential points can be generally expressed as:

$$(\text{distance}(p_0,p_1)+\text{distance}(p_1,p_2)+\ldots+\text{distance}(p_{n-1},p_n))/\text{distance}(p_0,p_n)$$

The number of points to be considered in performing the net distance analysis can be pre-determined or established through user input.

The net distance correction techniques can be used to eliminate one or more track points in a series for which the ratio of the distance traveled between successive points to the net distance traveled exceeds the net distance threshold. Further, the net distance threshold can be defined in accordance with user input. For example, a slider or other such interface element can be provided to receive input defining the net distance threshold value. A user supplied net distance threshold value can be established for use in a single operation, such as for application to a single track or any portion thereof, or can be established as a global value for use with all tracks processed by the device.

The correction application also can be configured to implement a severe angle correction technique. For example, a point associated with a track can be deleted if a severe angle value corresponding to the point falls below a severe angle threshold value. An angle can be measured between three sequential points. For example, the V-shaped sharp angles between sequential points depicted in FIG. 4 are representative of severe angles.

The correction application can be configured to determine the acute angle between two vectors, where each vector connects two sequential points in the series of points being evaluated. If the acute angle falls below the severe angle threshold value, the correction application can mark, suppress, reposition, or eliminate the point joining the two vectors. For example, when the severe angle threshold value equals ten degrees, if an angle between two vectors is less than ten degrees, the point joining the two vectors can be eliminated. In another example, the point joining the two vectors can be marked as a suspect bad point. Further, a suspected bad point can be identified to a user and input regarding the suspected bad point can be requested. For example, a user can be requested to indicate whether a suspect bad point should be relocated or to confirm that the suspected bad point should be eliminated. In some implementations, the severe angle threshold value can differ between track points. Further, in some implementations, the severe angle threshold value can be user defined. For example, a slider or other such interface element can be provided to receive input defining the severe angle threshold value. Also, a user supplied severe angle threshold value can be established for use in a single operation, such as for application to a single track or any portion thereof, or can be established as a global value for use with all tracks processed by the device.

Given location values at adjacent track points $p_1$ and $p_2$, the acute angle between two corresponding vectors, in degrees, can be computed using the following formula:

float angle=$a$ tan 2($p_2$.latitude,$p_2$.longitude)−$a$ tan 2($p_1$.latitude,$p_1$.longitude)

Because the formula will compute either the obtuse angle or the acute angle, the computed value must be kept in the −180 to 180 degrees domain to correspond to the acute angle. This domain can be obtained through the following formula:

if (angle>180) then angle=360−angle

If the computed acute angle is less than the severe angle threshold value, the angle is characterized as a severe angle and the middle, or linking, point between the two vectors can be relocated, replaced, or eliminated. In some implementations, a new location corresponding to the middle point can be determined through interpolation. Any known interpolation technique can be applied. In one example, the interpolated location can be determined by assuming a straight line of travel between the preceding and succeeding points, and the mid-point of the line connecting the preceding and succeeding points can be selected as the interpolated location. In another example, an intermediate vector originating at the middle point can be generated that bisects the acute angle and terminates at the mid-point of a straight line connecting the preceding and succeeding points. The interpolated location can be determined as a location along the intermediate vector, such as the mid-point. Other techniques for determining the interpolated location also can be applied.

The severe angle threshold value can be defined automatically by the correction application, either for a specific track or globally. Alternatively, the severe angle threshold can be determined in accordance with user input. For example, a slider or other interface element can be configured to receive user input specifying the acute angle threshold. Further, the user supplied severe angle threshold value can be established for use in a single operation, such as for application to a single track or any portion thereof, or as a global value for use with all tracks processed by the device.

In some other implementations, the severe angle determination can be extended beyond three sequential points. In such an implementation, the angles between sequential points can be added. Alternatively, one or more points in the sequence can be skipped in performing the severe angle determination. By skipping points, the number of computations performed to analyze a track can be reduced. If one or more points are skipped, an approximate angle between the vectors is determined. Further, since an approximation is used in a skipped point severe angle determination, a different severe angle threshold can be applied. For example, the range of angles considered to be severe can be increased.

Figure 6:
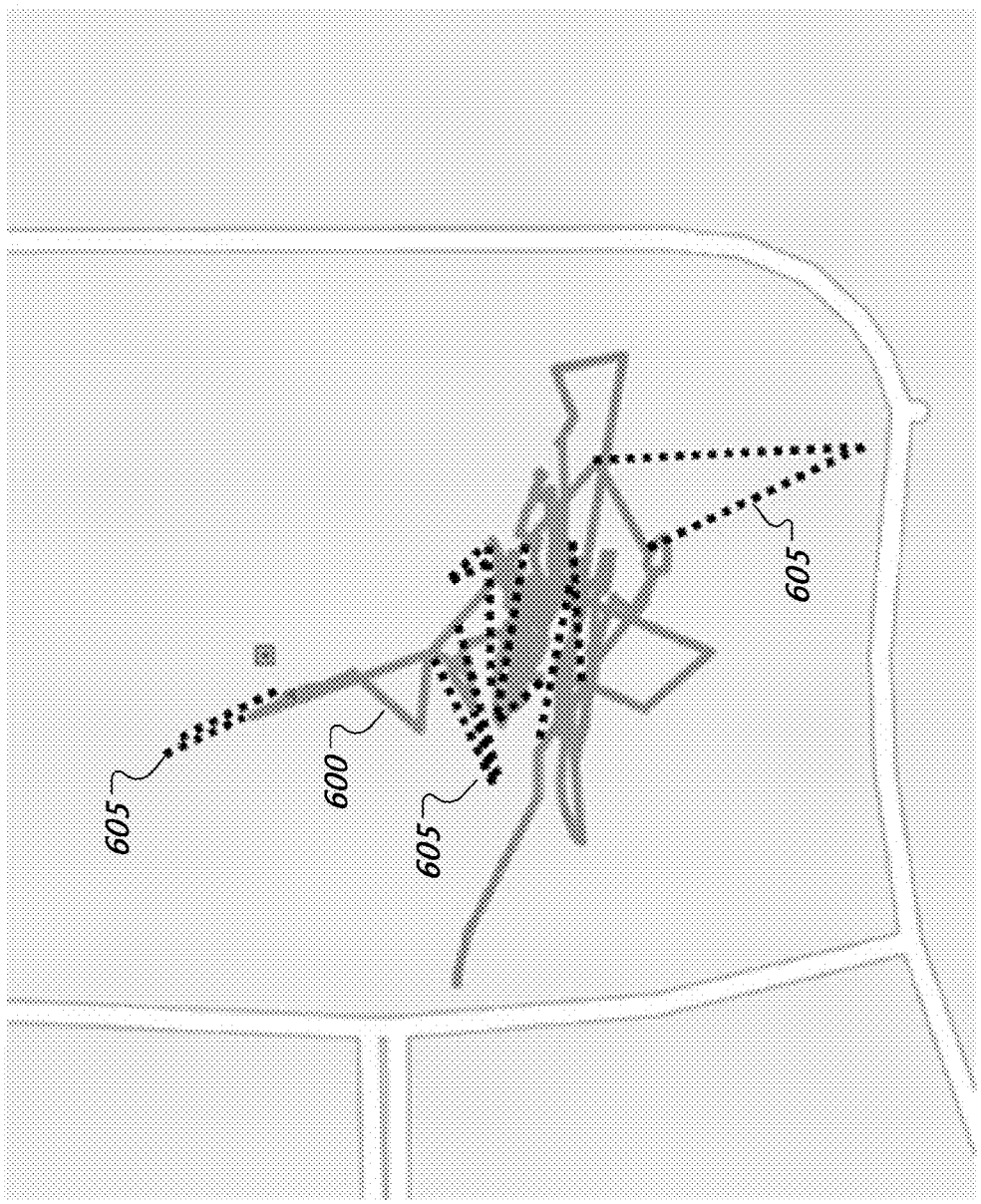

FIG. 6 shows an example of an error corrected track generated in accordance with track points corrected using net distance and severe angle correction techniques. Track 600 is depicted as a solid line, indicating the track points remaining after the net distance and severe angle correction techniques have been applied. Further, erroneous track segments 605 are depicted using dashed lines, indicating the track points deleted through application of the net distance and severe angle correction techniques.

As discussed above with respect to FIG. 3, the correction application also can be configured to implement an overlapping circle correction technique. For one or more points associated with a track, a circle can be centered on the track point. Further, the circle can have a radius corresponding to the point's DOP value. For example, the radius of the circle can increase with the DOP value, such that a circle associated with a point having a very accurate DOP value can have a very small radius.

A circle surrounding one point can overlap with a circle surrounding an adjacent point. The intersection of the circles can indicate a degree of accuracy for the corresponding points. Further, a circle that does not overlap with any other circles can indicate an erroneous track point. Additionally, the overlapping circles can be used to correct the location of one or more track points, such as through aggregation. For example, points with a higher degree of accuracy, such as based on DOP values, can be weighted more heavily than points with a lower degree of accuracy. One or more neighboring points then can be adjusted toward one another, in accordance with their relative weighting to generate corrected points. The correction application can perform the overlapping circle correction technique automatically or in response to user input.

Additionally, as discussed above with respect to FIG. 3, the occurrence of a number of closely spaced points can be used to determine that the corresponding location was a stopping point, such as a destination. A meta-point, e.g. signifying a destination, can be generated based on the amount of time the navigational unit was present at that location. Further, two or more of the closely spaced points can be simplified, such as through coalescing, to reflect the time spent at the location.

Coalescing is the process of converting multiple points, such as closely spaced points, into a single meta-point. The meta-point can be defined to include more data than a regular track point, such as information representing a bounding region within which the track points were coalesced. The bounding region can be configured as a boundary rectangle, polygon, or other geometric figure. In some implementations, the shape of the bounding area can be predetermined. In some other implementations, the shape of the bounding area can be configured in response to user input.

A time range, or duration, also can be associated with the coalesced meta-point. The time range can be expressed using a start time and a stop time, representing the time values associated with the first and last track points represented by the meta-point. Alternatively, the time range can be expressed as the elapsed time between the time values associated with the first and last track points represented by the meta-point. Coalescing can be used to simplify a track, such as by consolidating a track segment representing a period without motion. Coalescing can be performed automatically or in response to user input. Further, coalescing can be performed with respect to an entire track or one or more portions of a track.

One or more interface tools also can be provided to permit a user to specify a degree of simplification. For example, an area slider can be provided to permit a user to specify the size of an area, or area threshold, within which track points can be coalesced. Further, a time slider can be provided to permit a user to specify the amount of time, or time threshold, that must be spent within an area in order for the track points in that area to be coalesced. As either or both of the area and time values increase, the degree of simplification performed with respect to the track increases. Alternatively, a single simplification interface tool can be provided, such as a dial or slider. The single simplification tool can be used to enter a simplification value indicating an increase or decrease in overall simplification. Further, the simplification value can be converted into separate time and area values in accordance with a predetermined relationship. The relationship between the time and area values can be linear or non-linear.

Figure 7:
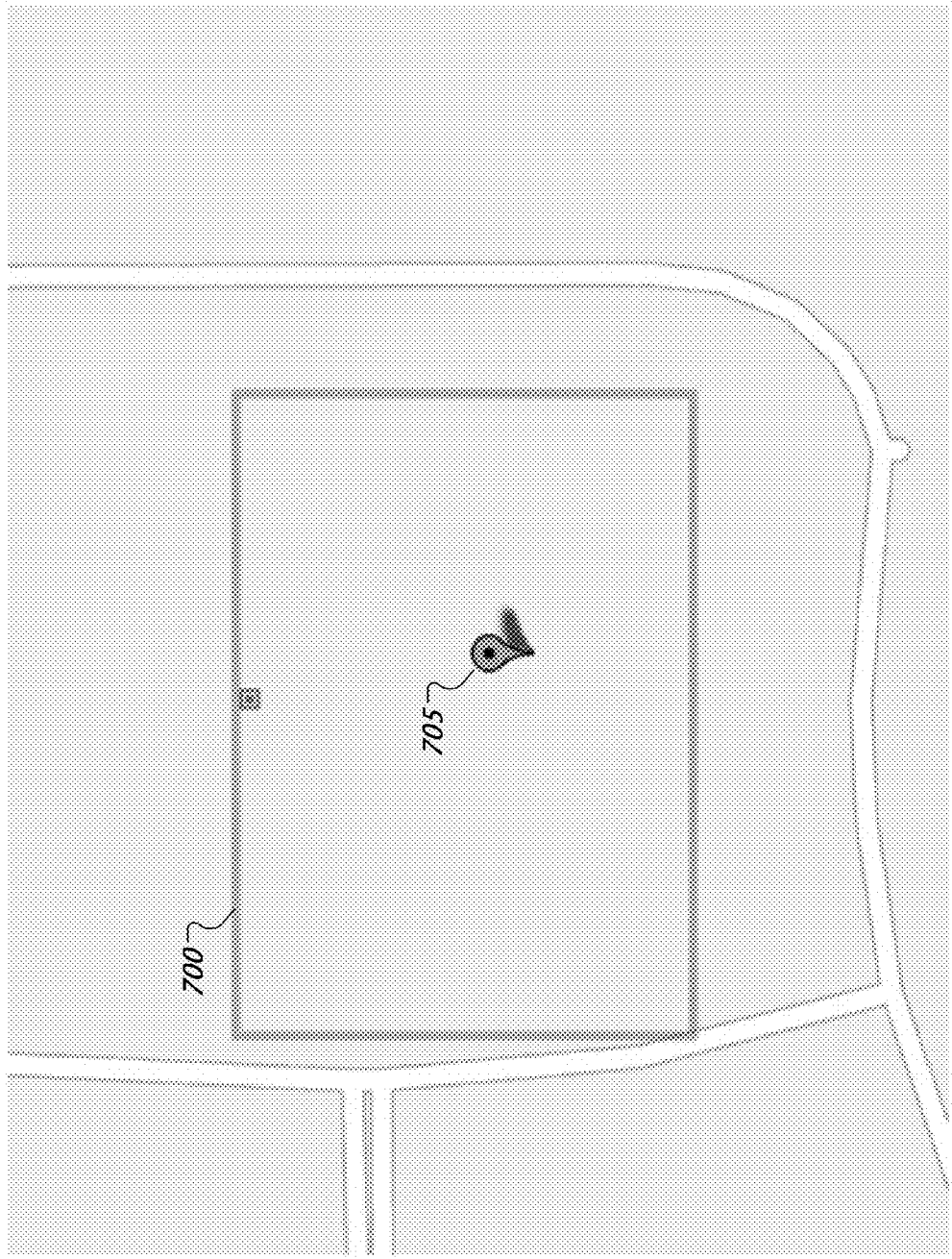
FIG. 7 shows an example of a meta-point generated through coalescing.

FIG. 7 shows an example of a meta-point generated through coalescing. The meta-point includes bounded area 700 (or bounded region) and centroid 705. In some implementations, the meta-point can be determined after the correction application has performed one or more correction operations on the recorded track file. For example, the meta-point, including bounded area 700 and centroid 705 can be generated by a coalescing process after one or more of DOP, acceleration, net distance, and severe angle correction techniques have been applied.

The coalescing process employs two threshold values: a minimum time duration and a maximum distance the track points can move. For example, the navigational unit must spend at least N seconds in a space no larger than M size in order to trigger the coalescing process. The threshold values can be predetermined, such as based on heuristics, or can be user defined. For example, interface elements, such as sliders, can be presented to receive user input specifying the coalescing threshold values. When the navigational unit spends at least N seconds in the space no larger than M size, the track points recorded during that time range and within that bounded area can be coalesced into a single meta-point. Further, as described above, the meta-point can be represented to include a centroid within the bounding region. The location of the centroid can be user specified, a geometric center of the bounding region, or an average location of the track points associated with the meta-point.

Figure 8:
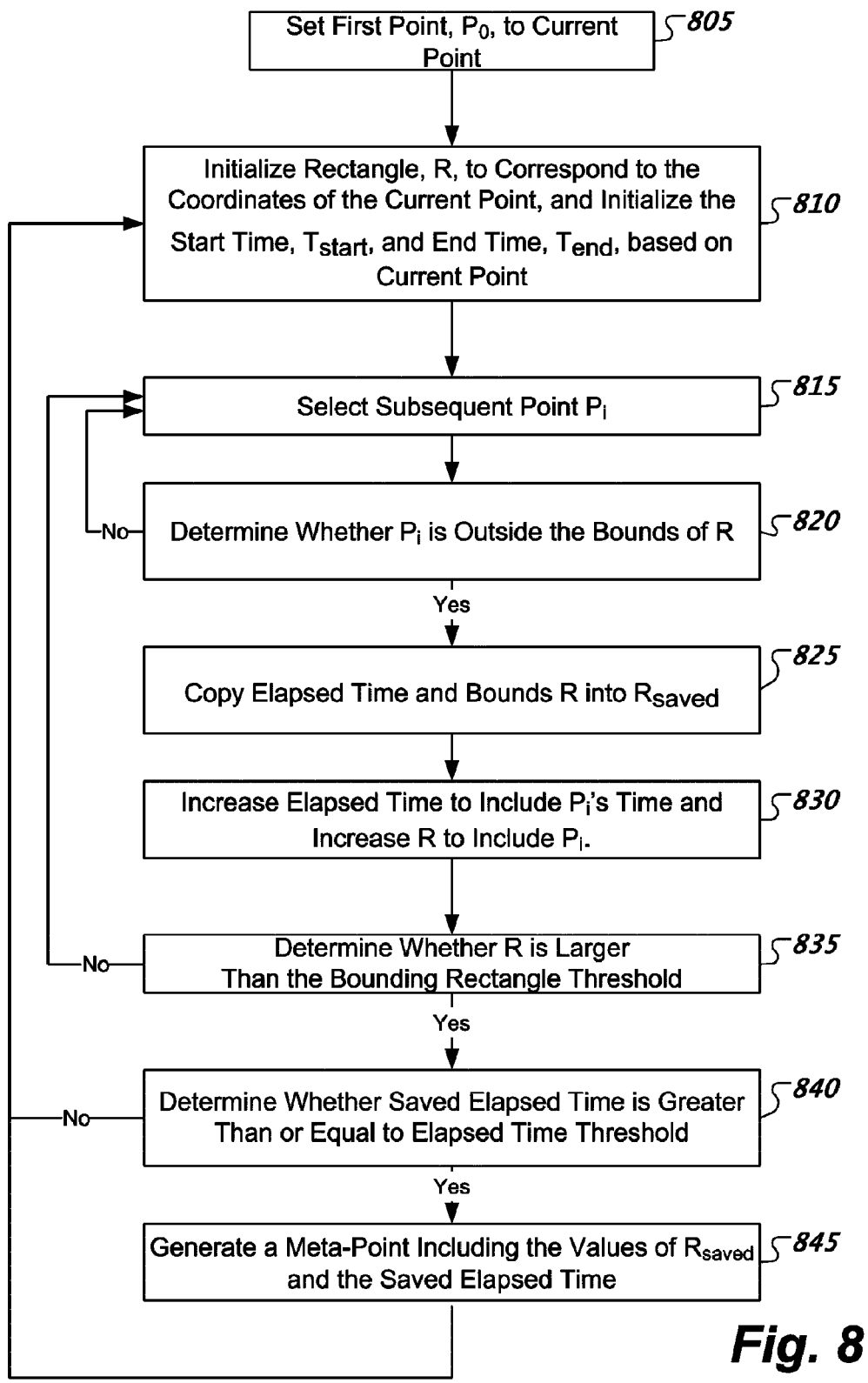
FIG. 8 shows an example of a coalescing algorithm.

FIG. 8 shows an example of a coalescing algorithm. A first point, $p_0$, can be set to the current point (805). A rectangle, R, can be initialized to correspond to the coordinates of the current point, and the start time, $T_{start}$, and the end time, $T_{end}$, can be initialized with the time value of the current point (810). Initializing the rectangle R can result in the definition of a rectangle with no height or width (a zero-size rectangle). Further, initializing the start time and end time can result in a duration reflecting no elapsed time. In some implementations, a different geometric shape can be initialized, such as in response to user input.

The coalescing algorithm can select a subsequent point, $p_i$, associated with the track and occurring after the first point, $p_0$ (815). Further, the subsequent point, $p_i$, can be incremented as the coalescing algorithm advances. For the subsequent point, $p_i$, it can be determined whether $p_i$ is located outside the bounded area defined by R (820). Further, the bounded area R and the elapsed time are updated based on the values corresponding to the point $p_i$. If $p_i$ is not located outside the bounded area defined by R, the coalescing algorithm increments the value of i, advances to the next point $p_i$ (815). The coalescing algorithm then determines whether the new point $p_i$ is located outside the bounded area defined by R (820).

If $p_i$ is located outside of the bounded area defined by R, the elapsed time and the bounded area R can be copied into $R_{saved}$ (825). The elapsed time can be increased to include the time associated with each previous point determined to be within the bounded area R and the dimensions of the bounded area R can be increased to include the location of the current point $p_i$ (830). Further, the coalescing algorithm can determine whether the value R exceeds the bounding rectangle threshold (835). If the value R does not exceed the bounding rectangle threshold, the coalescing algorithm increments the value of i, advances to the next point $p_i$ (815).

If the value R is larger than the bounding rectangle threshold, it can be determined whether the saved elapsed time for the points corresponding to $R_{saved}$ is greater than or equal to the elapsed time threshold (840). If the saved elapsed time for the points corresponding to $R_{saved}$ is less than the elapsed time threshold, the coalescing algorithm initializes the value R to correspond to the coordinates of the current point and initializes the start time, $T_{start}$, and the end time, $T_{end}$, to the time value of the current point (810).

If the saved elapsed time for the points corresponding to $R_{saved}$ is greater than or equal to the elapsed time threshold, a meta-point is generated, including the value of $R_{saved}$ and the saved elapsed time (845). In some implementations, the elapsed time can be included in the value of $R_{saved}$. Upon generating the meta-point, the coalescing algorithm can be configured to select a new point, $p_0$, such as by selecting the next point included in the track (805). When the last point associated with the track has been processed, the coalescing algorithm can examine the currently defined rectangle R to determine whether it should be converted into a meta-point. Further, the coalescing algorithm can create a final point list that includes both regular points and meta-points.

Figure 9:
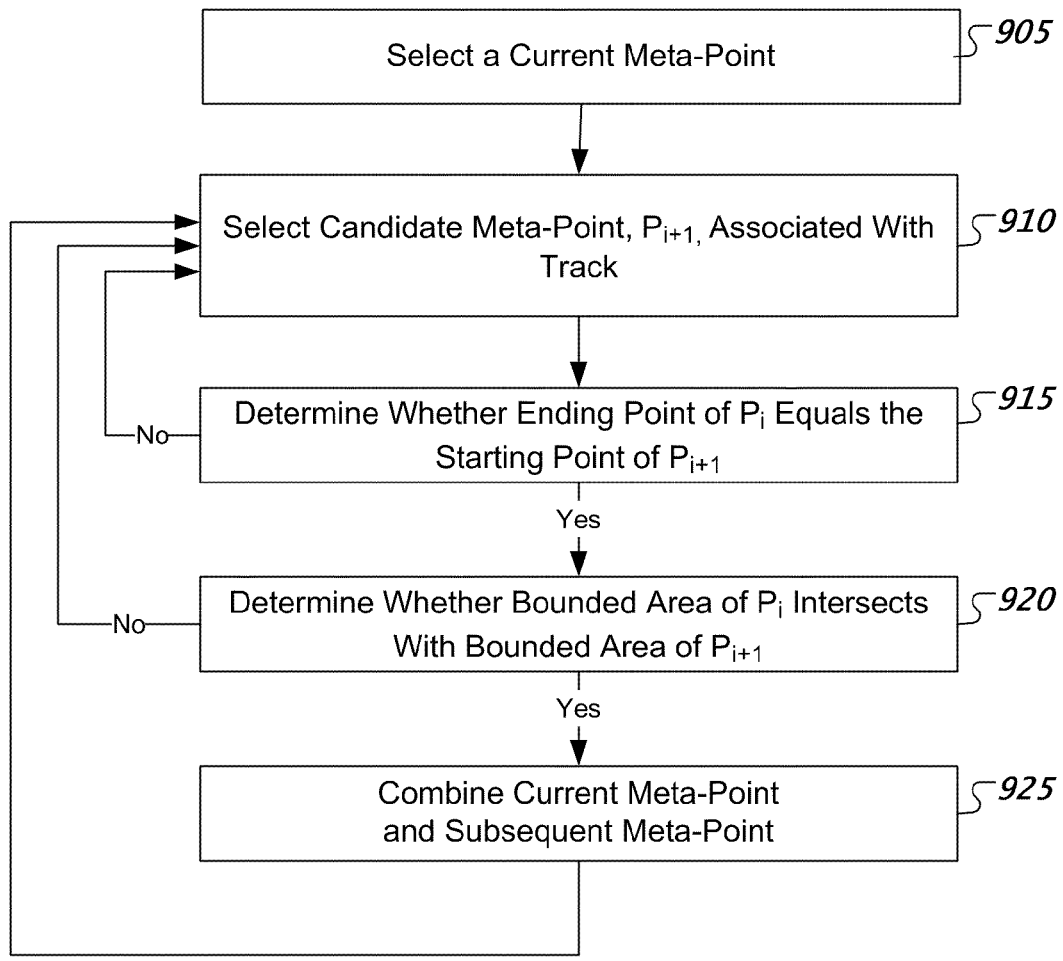
FIG. 9 shows an example of a meta-point combining algorithm.

FIG. 9 shows an example of a meta-point combining algorithm. The meta-point combining algorithm can be implemented to combine two or more meta-points, such as adjacent meta-points. A centroid and a bounding rectangle can be associated with each meta-point. In some implementations, the centroid can be computed, such as by averaging the location of points included in the meta-point or by determining the geometric center of the meta-point. In some other implementations, the centroid can be defined through user input. Further, the meta-point can include information identifying the starting point and ending point of the track that fall within the meta-point. Additionally, the meta-point can include information identifying a start time and an end time for the meta-point. If a track does not contain at least two meta-points, the meta-point combining algorithm can be skipped. A current meta-point, $p_i$, can be selected from a track (905). For example, the current meta-point can be selected from a list of points or other such identification of track points associated with a track. For example, the first meta-point associated with the track can be selected as the current meta-point.

A candidate meta-point, $p_{i+1}$, associated with the track also can be selected (910). For example, the meta-point immediately succeeding the current meta-point, $p_i$, can be selected. The candidate meta-point also can be selected from a list of points or other such identification of track points. The ending point associated with the current meta-point, $p_i$, can be compared with the starting point of the candidate meta-point, $p_{i+1}$, to determine whether they are equal or overlapping (915). If the ending point of the current meta-point, $p_i$, does not equal or overlap the starting point of the candidate meta-point, $p_{i+1}$, the meta-point combining algorithm can be incremented such that the candidate meta-point becomes the current meta-point and a subsequent meta-point, if available, is selected as the candidate meta-point (910). In some implementations, instead of or in addition to using the starting and ending points, the end time of the current meta-point, $p_i$, can be compared with the start time of the candidate meta-point, $p_{i+1}$, to determine whether they are equal or overlapping.

If the ending point of the current meta-point equals or overlaps the starting point of the candidate meta-point, it can be determined whether the bounded area, e.g., the rectangle, of the current meta-point intersects with the bounded area of the candidate meta-point (920). If the bounded area of the current meta-point does not intersect with the bounded area of the candidate meta-point, the meta-point combining algorithm can be incremented such that the candidate meta-point becomes the current meta-point and a subsequent meta-point, if available, is selected as the candidate meta-point (910).

Otherwise, the current meta-point and the candidate meta-point can be combined (925). For example, the ending point of the current meta-point can be altered to equal the ending point of the candidate meta-point. Also, the end time of the current meta-point can be set to equal the end time of the candidate meta-point. Further, the bounded area associated with the current meta-point can be merged with the bounded area of the candidate meta-point to form a combined bounded area. Additionally, the combined meta-point can be set as the current meta-point and a subsequent meta-point, if available, can be selected as the candidate meta-point (910). The meta-point combining algorithm can modify the track being processed to reflect combined meta-points.

Figure 10:
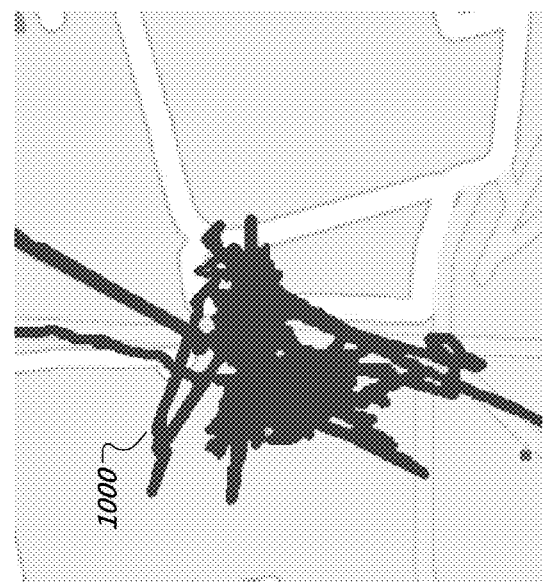
FIG. 10 shows an example of an uncoalesced track, generated from track points included in a track file.

FIG. 10 shows an example of an uncoalesced track, generated from track points included in a track file. In some implementations, the track points can include both location and time data. In some other implementations, time data can be excluded from one or more of the track points. As described above, a coalescing technique can be performed for at least a portion of the uncoalesced track 1000. The coalescing technique can be performed before, after, or simultaneously with one or more correction techniques. For track points that do not include time data, the coalescing technique can be performed based solely on location data.

Figure 11:
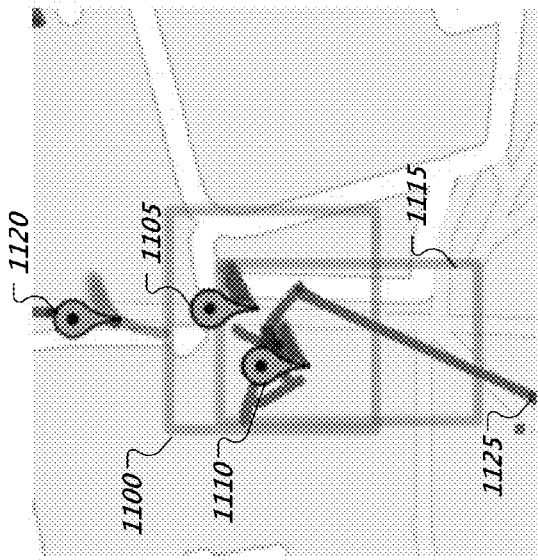
FIGS. 11-12 show examples of a coalesced track.

FIG. 11 shows an example of the coalesced track 1125 in which track points have been merged. The coalesced track 1125 corresponds to the uncoalesced track 1000. As a result of the coalescing technique, two meta-points have been generated. The first meta-point includes centroid 1105 and encompasses bounded area 1100. The second meta-point includes centroid 1110 and encompasses bounded area 1115. Centroids 1105 and 1110 can be positioned with the bounded areas 1100 and 1115, respectively, based on the corresponding geometric center, an average location of the coalesced track points, or user input. Additionally, meta-point 1120 can be generated to represent two or more consecutive track points having the same location. Because the location of each track point is the same, the redundant track points can be consolidated into a meta-point that does not include a bounded area.

Figure 12:
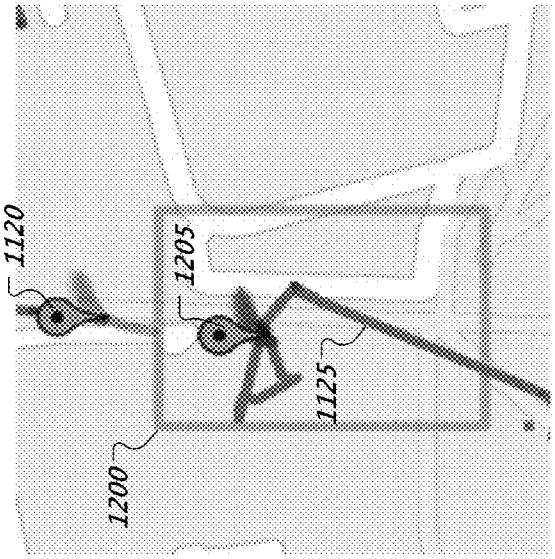

FIG. 12 shows an example of coalesced track 1125 after the first and second meta-points have been combined. Bounded area 1100 of the first meta-point and bounded area 1115 of the second meta-point have been merged to form bounded area 1200 of the combined meta-point. Further, centroid 1105 of the first meta-point and centroid 1110 of the second meta-point have been replaced by centroid 1205 of the combined meta-point. Centroid 1205 can be positioned within the bounded area 1200 based on an average location of the track points included in the combined meta-point, the geometric center of the bounded area 1200, or in response to user input. For example, a user can drag a representation of the centroid 1205 to a location within the bounded area 1200. Additionally, track information in the corresponding track file can be updated to reflect the combined meta-point.

FIG. 13 is a schematic diagram of an example computer system 1300 that can be utilized to implement the disclosed systems and methods. Computer system 1300 includes display device 1305, computer 1310, input device 1315, and pointing device 1320. The correction application can be implemented in any suitable computer system 1300 (e.g., desktop computer, laptop computer, personal digital assistant (PDA), smartphone, or work station). Information can be displayed to a user using any suitable display device 1305 including a cathode ray tube (CRT), an LCD, and an OLED monitor. A user can use input device 1315 (e.g., keyboard, keypad, touch pad, voice command) and any suitable pointing device 1320 (e.g., mouse, joystick, track ball, stylus, touch screen) to interact with the correction application. Display device 1305, input device 1315, and pointing device 1320 can be operatively coupled with computer 1310 through wired or wireless means.

The correction application can be executed by a central processing unit (CPU) within computer 1310 in accordance with an operating system, such as the Macintosh Operating System (Mac OS). The correction application also can be executed on a computer system hosting any other operating system, such as Microsoft Windows, UNIX, and Linux. Computer system 1300 can be a stand-alone device such as a desktop computer. Alternatively, computer system 1300 can be implemented in a networked environment, where the correction application can be installed on a server and accessed remotely.

Computer 1310 can include a microprocessor, one or more communications busses and/or interfaces, a random access memory (RAM) and a read only memory (ROM). The microprocessor can perform the operations specified by a user based on user input and instructions from RAM or ROM or both. In addition, computer 1310 can include a storage device to store coordinate and time information, and other additional content. The storage device can reside in computer 1310. Alternatively, the storage device can reside external to computer 1310. Also, the storage device can reside in the recording instrument. The recording instrument can be operatively coupled to computer 1310 through wired or wireless means to retrieve stored content.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, a keyboard, and a pointing device. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although implementations have been described in detail above, other modifications are possible. For example, the flow diagram depicted in the figures do not require the particular order shown, or sequential order, to achieve desirable results. In addition, other steps may be provided, or steps may be eliminated, from the described flow diagrams, and other components may be added to, or removed from, the described systems. Accordingly, various modifications may be made to the disclosed implementations and still be within the scope of the following claims.

What is claimed is:

1. A method of processing a track data set, the method comprising:
    accessing a track data set having track points defining a course;
    identifying inaccurate track points and incorrect track points, wherein identifying inaccurate track points comprises comparing, for one or more of the track points, a dilution of precision (DOP) value associated with the track point to a DOP threshold, and identifying incorrect track points comprises performing an error correction process; and
    generating a corrected track by removing identified inaccurate track points and incorrect track points from the track data set.

2. The method of claim 1, wherein identifying an inaccurate track point further comprises:
    determining that the DOP value associated with the track point exceeds the DOP threshold.

3. The method of claim 1, wherein:
    identifying inaccurate track points can be performed before, after, or substantially simultaneously with identifying incorrect track points.

4. The method of claim 1, further comprising:
    receiving user input specifying the DOP threshold.

5. The method of claim 1, wherein the DOP value associated with the track point comprises a horizontal DOP value.

6. The method of claim 1, wherein performing an error correction process further comprises:
    determining an acceleration value corresponding to a track point;
    comparing the determined acceleration value to an acceleration threshold; and
    identifying the track point as an incorrect track point when the determined acceleration value exceeds the acceleration threshold.

7. The method of claim 1, wherein performing an error correction process further comprises:
    determining, for a sequence of three or more track points, a total distance traveled and a net distance traveled;
    comparing the net distance traveled to the total distance traveled; and
    identifying a track point included in the sequence of three or more track points as an incorrect track point when the total distance traveled exceeds the net distance traveled by more than a distance threshold.

8. The method of claim 1, further comprising:
    determining that a common location value is associated with successive track points; and
    consolidating the successive track points to generate a meta-point.

9. The method of claim 1, further comprising:
    identifying a first track point and a second track point located within a bounded area;
    determining that a duration between the first track point and the second track point exceeds a minimum time threshold; and
    generating a meta-point by coalescing the first track point and the second track point.

10. The method of claim 1, wherein generating a corrected track further comprises:
    including in the corrected track an interpolated track point having an interpolated location, the interpolated track point corresponding to at least one incorrect track point.

11. A computer storage medium encoded with a computer program, the program comprising instructions that when executed by data processing apparatus cause the data processing apparatus to perform operations comprising:
  accessing a track having track points defining a course;
  identifying inaccurate track points and incorrect track points, wherein identifying inaccurate track points comprises comparing, for one or more of the track points, a dilution of precision (DOP) value associated with the track point to a DOP threshold, and identifying incorrect track points comprises performing an error correction process; and
  generating a corrected track by removing identified inaccurate track points and incorrect track points from the track.

12. The computer storage medium encoded with a computer program of claim 11, wherein the instructions further cause the data processing apparatus to perform operations comprising:
  determining, based on the comparing, that the DOP value associated with the track point exceeds the DOP threshold.

13. The computer storage medium encoded with a computer program of claim 11, wherein:
  identifying inaccurate track points can be performed before, after, or substantially simultaneously with identifying incorrect track points.

14. The computer storage medium encoded with a computer program of claim 11, wherein the DOP value associated with the track point comprises at least one of a horizontal, vertical, time, or positional DOP value.

15. The computer storage medium encoded with a computer program of claim 11, wherein the instructions that cause the data processing apparatus to perform an error correction process further cause the data processing apparatus to perform operations comprising:
  determining an acceleration value corresponding to a track point;
  comparing the determined acceleration value to an acceleration threshold, wherein the acceleration threshold is determined in accordance with a sampling frequency of the track points; and
  identifying the track point as an incorrect track point when the determined acceleration value exceeds the acceleration threshold.

16. The computer storage medium encoded with a computer program of claim 11, wherein the instructions that cause the data processing apparatus to perform an error correction process further cause the data processing apparatus to perform operations comprising:
  determining, for a sequence of three or more track points, a ratio of a total distance traveled to a net distance traveled;
  comparing the ratio with a distance threshold; and
  identifying a track point included in the sequence of three or more track points as an incorrect track point when the ratio exceeds the distance threshold.

17. The computer storage medium encoded with a computer program of claim 11, wherein the instructions further cause the data processing apparatus to perform operations comprising:
  determining that a common location value is associated with successive track points included in the track;
  consolidating the successive track points to generate a meta-point; and
  determining a start time and an end time corresponding to the meta-point in accordance with time data associated with the successive track points.

18. The computer storage medium encoded with a computer program of claim 11, wherein the instructions further cause the data processing apparatus to perform operations comprising:
  identifying a first track point and a second track point located within a bounded area;
  determining that a duration between the first track point and the second track point exceeds a minimum time threshold; and
  coalescing the first track point and the second track point to generate a meta-point.

19. The computer storage medium encoded with a computer program of claim 18, wherein the meta-point is characterized by a geometric shape, a time range, a starting track point, and an ending track point.

20. The computer storage medium encoded with a computer program of claim 19, wherein the instructions further cause the data processing apparatus to perform operations comprising:
  receiving user input defining the geometric shape.

21. The computer storage medium encoded with a computer program of claim 11, wherein the instructions that cause the data processing apparatus to remove identified inaccurate track points and incorrect track points further cause the data processing apparatus to perform operations comprising:
  receiving user input confirming removal of the identified inaccurate track points and incorrect track points.

22. The computer storage medium encoded with a computer program of claim 11, wherein the instructions that cause the data processing apparatus to generate a corrected track further cause the data processing apparatus to perform operations comprising:
  including in the corrected track an interpolated track point having an interpolated location, the interpolated track point corresponding to at least one incorrect track point.

23. A system comprising:
  a data processing device including a navigational unit; and
  one or more processors configured to perform operations comprising:
    generating a track having track points associated with a course, based on input from the navigational unit;
    identifying inaccurate track points and incorrect track points, wherein identifying inaccurate track points comprises comparing, for one or more of the track points, a dilution of precision (DOP) value associated with the track point to a DOP threshold, and identifying incorrect track points comprises performing an error correction process; and
    generating a corrected track by removing identified inaccurate track points and incorrect track points from the track.

24. The system of claim 23, wherein the one or more processors are further configured to perform operations comprising:
  determining, based on the comparing, that the DOP value associated with the track point exceeds the DOP threshold.

25. The system of claim 23, wherein the one or more processors are further configured to perform operations comprising:
  determining an acceleration value corresponding to a track point;
  comparing the determined acceleration value to an acceleration threshold; and identifying the track point as an incorrect track point when the determined acceleration value exceeds the acceleration threshold.

26. The system of claim 23, wherein the one or more processors are further configured to perform operations comprising:
determining that a common location value is associated with successive track points included in the track;
consolidating the successive track points to generate a meta-point; and
determining a start time and an end time corresponding to the meta-point in accordance with time data associated with the successive track points.

27. The system of claim 23, wherein the one or more processors are further configured to perform operations comprising:
identifying a first track point and a second track point located within a bounded area;
determining that a duration between the first track point and the second track point exceeds a minimum time threshold; and
coalescing the first track point and the second track point to generate a meta-point, wherein the meta-point is characterized by a geometric shape, a time range, a starting track point, and an ending track point.

28. The system of claim 23, wherein the one or more processors configured to generate a corrected track further cause the data processing apparatus to perform operations comprising:
including in the corrected track an interpolated track point having an interpolated location, the interpolated track point corresponding to at least one incorrect track point.

29. A method of processing a track, the method comprising:
accessing a corrected track having track points defining a course, wherein each track point is associated with a location;
defining a bounded area associated with a first track point;
determining that a location associated with a second track point coincides with the bounded area; and
generating a meta-point by coalescing the first track point and the second track point.

30. The method of claim 29, further comprising:
receiving user input specifying a portion of the corrected track for which coalescing can be performed; and
selecting the first track point from the specified portion of the corrected track.

31. The method of claim 29, further comprising:
receiving input from a user specifying a shape and a size of the bounded area.

32. The method of claim 29, further comprising:
performing an error correction process to identify one or more incorrect track points corresponding to the track; and
generating a corrected track by removing the incorrect track points.

33. The method of claim 32, wherein performing an error correction process further comprises:
determining a first vector associated with a first track point and a second track point and a second vector associated with the second track point and a third track point;
computing an acute angle between the first vector and the second vector; and
identifying the second track point as an incorrect track point when the acute angle is less than a severe angle threshold.

34. The method of claim 29, further comprising:
receiving input from a user specifying a degree of simplification for the corrected track; and
defining the bounded area in accordance with the specified degree of simplification.

35. The method of claim 34, further comprising:
defining a time threshold for use in coalescing in accordance with the specified degree of simplification.

36. The method of claim 29, further comprising:
performing an error correction process to identify an incorrect track point corresponding to the track;
determining an interpolated location for the incorrect track point, based on other track points defining the course; and
generating a corrected track by associating the incorrect track point with the interpolated location.

* * * * *